Patented Sept. 26, 1944

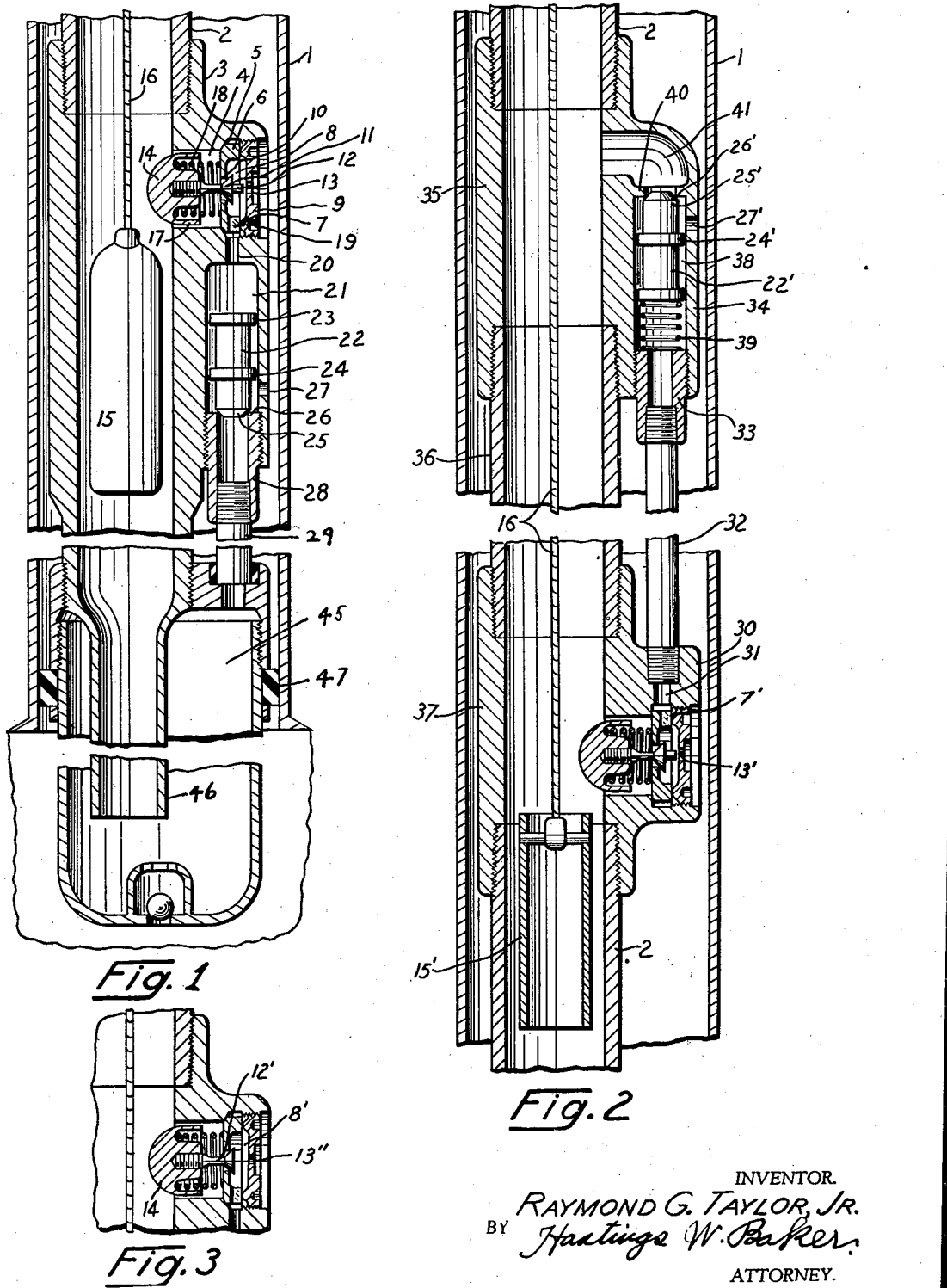

2,358,944

UNITED STATES PATENT OFFICE 2,358,944

SURFACE OPERATED VALVE FOR OIL WELLS

Raymond G. Taylor, Jr., Dallas, Tex., assignor to The Guiberson Corporation, Dallas, Tex., a corporation of Delaware Application April 2, 1941, Serial No. 386,465

20 Claims. (Cl. 103—234)

The object of this invention is to provide a wire line operated valve which is exceedingly simple in construction, is cheap to manufacture and lends itself to quantity production.

It has heretofore been proposed to open a ball valve by means of a weight on a wire line, but such a mechanism has many disadvantages which I overcome in the structure shown and described in this application. Such a type of ball valve is, for instance, shown in the Nixon Patent 2,171,480 in which three balls are employed adapted to be simultaneously unseated by a weight. If we suppose that there is a casing pressure of 600 pounds per square inch and a tubing pressure of 100 pounds per square inch at the valves and if the diameter of the valve seat is ¾ inch, we would have a valve seat area of .442 square inch and a differential between the casing and tubing pressures of 500 pounds per square inch, which pressure is tending to maintain the valve closed by pressing the balls against the valve seats. We would, therefore, have a pressure of 500 times .442 or 221 pounds tending to keep each ball valve closed and there being three ball valves, the weight on the wire line would have to be operated with a pressure of approximately 663 pounds to unseat these three ball valves. I propose an extremely simple and convenient pilot valve mechanism which can easily be unseated by a weight on a wire line and which pilot valve controls a second valve of larger area so that the wire line need be operated with a very small force in order to unseat the pilot valve and to control the larger valve.

Ball valves are furthermore objectionable in that the weight striking directly on the balls causes a worn spot on the balls and as these balls rotate, these worn spots will eventually contact the valve seat and as a result there will be a leaky valve.

Another objection to the ball valves is that the volume of gas passing through the valves is dependent in large measure upon the diameter of the valve seat and the distance the ball is moved from the valve seat. Since the balls of the ball valves have to project through the seat to be contacted by the weight, it is obvious that these ball valves will be opened only a small fraction of an inch and they, therefore, present an obstruction to the free passage of gas. In my preferred construction I overcome all of the said difficulties as will appear in the detailed specification.

Other objects and advantages of the invention will be disclosed in the specification and claims which follow.

The invention may be better understood by referring to the drawing in which,

Fig. 1 is a cross-sectional view of my improved valve mechanism including a portion of the tubing and casing, certain of the parts being shown in side elevational view, together with a packer, chamber and standing valve.

Fig. 2 is a view similar to Fig. 1 showing a modification, and so arranged as to let gas into the tubing at the valve.

Fig. 3 is a detail of the valve mechanism showing a second modification.

A conventional casing 1 and tubing 2 are employed. The tubing or flow line 2 is provided with a housing 3 which is screw threaded to the upper and lower sections of the tubing 2 and the inside of the said housing has a bore of the same size as the bore of the tubing. The housing 3 is provided with a laterally extending port 4 communicating with the inside of the housing. The port 4 communicates with an enlarged opening 5 which at its outer end is screw-threaded. A plug 6 is mounted in the opening 5 and its inner end rests against the shoulder between the enlarged opening 5 and the port 4. At the lower end of the plug 6 is a vertically extending passageway 7 communicating with a chamber 8 between the outer portion of the cup-shaped plug 6 and the inner face of a screw-threaded plug 9. Any suitable means may be employed to prevent the plug 6 from rotating so that the passageway 7 will also be in proper position. The plug 6 is provided with a bore in the central portion thereof forming a valve seat 10 for a valve 11 on a valve stem 12. The plug 9 is provided with an aperture 13 in alignment with the valve stem 12 and into which the valve stem 12 will project when the valve 11 is unseated from its valve seat 10. When the valve stem 12 is in the aperture 13, it closes said aperture. The valve stem 12 projects through the plug 6 and is screwed into a knob 14 which projects into the bore of the housing 3 or into a position to be contacted by the weight 15 on the wire line 16; which wire line, of course, extends to the top of the well and may be operated manually or by any suitable mechanism, electrical, mechanical, or otherwise. The knob 14 is substantially semi-spherical providing a cam surface for the weight to contact. Preferably, it is provided with a circular flange 17 which receives one end of a spring 18, the other end of which presses against the inner surface of the plug 6 thereby normally maintaining the valve 11 on its valve seat 10 and in this position the valve stem 12 does not project into the aperture 13 so that the compressed gas in the casing could pass through the aperture 13 and downwardly through the passageway 7, but would not pass into the port 4 for the said port is closed by means of the valve 11 engaging the valve seat 10. The plug 9 is threaded so as to engage the threads of the opening 5 and is provided with holes 19 which may be engaged by a wrench to tighten the plug 9 against the plug 6.

The passageway 7 communicates with a passageway 20 which passageway extends downwardly and communicates with a chamber 21 which is a cylinder in which the large valve member 22 moves vertically. It will be noted that the valve member 22 is much larger than the valve 11 and I, therefore, consider that the valve 11 is a pilot valve which controls the valve member 22 which may be called the operating valve in contradistinction to the pilot valve. The valve member 22 is provided with a circular flange 23 at or near the top thereof and a similar flange 24 intermediate its length. The flanges 23 and 24 are slightly smaller in cross-sectional area than the chamber 21 so that the compressed air from the casing cannot readily pass said flanges 23 and 24. With the parts in the position shown in Fig. 1 the chamber 21 above the circular flange 23 is virtually a dead air chamber.

The operating valve member 22 is provided with a valve 25 at the lower end thereof which seats on a valve seat 26. Below the flange 24 and above the valve seat 26 the housing 3 is provided with a port 27 communicating with the compressed air in the casing 1. The housing 3 is screw-threaded at its lower end and receives a connection 28, the upper end of which carries the valve seat 26 and which pipe forms a passageway communicating with a second pipe 29. This pipe 29 is connected to a chamber 45 leading to the eduction tube 46. A packer 47 seals the space between the casing and the chamber 45 so as to prevent the compressed gas in the casing from contacting the formation sands. Inasmuch as there are various such arrangements, I do not limit myself to this specific chamber construction.

In operation, compressed air is introduced into the casing through conventional means. This compressed air cannot pass into the tubing for the valve 25 is seated on its valve seat 26 and the valve 11 is seated on its valve seat 10. This condition will continue regardless of how great the casing pressures may be and irrespective of what the tubing pressures may be and assuming, of course, that the casing pressures exceed the tubing pressure. Let us assume, for instance, that the tubing pressures are 100 pounds per square inch and the casing pressures are 600 pounds per square inch. The lower flange 24 of the valve member 22 would receive the casing pressures by the compressed air passing through the port 27 and the casing pressures would also be impressed against the upper surface of the circular flange 23 for the pressures in the chamber 21 are the same as the casing pressures for this chamber communicates with the casing through the passageway 20, passageway 7, chamber 8, and aperture 13 so that we would have considerably more pressures tending to push the operating valve member 22 downwardly than we would have pressures tending to push it up with the net result that the said valve remains closed. The valve 11 would, of course, remain closed until the weight was operated. When, however, the operator raises the weight 15 by means of pulling upwardly on the wire line 16, the said weight engages the knob 14 and removes the valve 11 away from its valve seat 10 and projects the valve stem 12 into the aperture 13 thereby closing said aperture 13. The compressed gas in the chamber 21 above the flange 23 now by-passes through the port 4 into the tubing so that the pressure in the chamber 21 now drops to tubing pressure, while the lower surface of the circular flange 24 receives casing pressure so that the force tending to push the operating valve upwardly now exceeds the force tending to push it downwardly. This overbalance of forces is much greater than the weight of the valve member 22 so that the valve 25 moves to the upper end of the chamber 21 so that a practically unobstructed passageway extends from the casing into the tubing through the port 27 and pipes 28 and 29 so that the oil in the tubing is ejected.

When the oil in the tubing above the point where the pipe 29 leads into the tubing has been ejected, or at any other time desired by the operator, the weight 15 may be lowered so that the spring 18 closes the valve 11 and uncloses the aperture 13, so that immediately thereafter we have casing pressure in the chamber 21 which causes the operating valve 22 to close, moving the valve 25 against its seat 26 and thereby preventing further introduction of compressed gas into the tubing.

Such a valve as above described may, of course, be substituted and used in place of the valve shown in my co-pending application, Serial No. 386,466, filed April 2, 1941. In other words, in order to unload a well in which oil is standing in both the tubing and the casing, I may provide a series of valves at spaced vertical elevations in the tubing and might unload through the casing by introducing compressed gas into the tubing in which case the compressed gas would force the oil in the tubing downwardly and upwardly through the pipes 29 and 28, unseating the valve member 22 and the oil would pass out of the port 27 into the casing and after the oil had thus been displaced from the tubing into the casing so as to expose the lower end of the pipe 29 to the compressed gas of the tubing, the said compressed gas would expel the oil in the casing above the port 27. Ordinarily, however, except on unloading operations, I would expect to introduce the compressed air into the casing and introduce this compressed air into the tubing when the weight 15 was operated so as to operate the pilot valve which in turn would control the main operating valve 22.

In regard to the amount of force necessary to unseat the valve 11 and assuming that the seat on the pilot valve was $\frac{3}{16}$ in. in diameter, we would have an area of approximately .027 square inch and further assuming that we had a pressure of 600 pounds in the casing and 100 pounds in the tubing, we would have a pressure differential of 500 pounds per square inch, which multiplied by the area of the valve seat of .027 square inch gives a pressure of 13½ pounds. In other words, I can unseat my pilot valve by the weight 15 impressing a force of 13½ pounds on the knob 14 plus the tension of the spring 18 which spring need not be a very heavy spring. It is, therefore, apparent that with the ball valves recited in the first part of this specification requiring approximately 663 pounds to open the same, I can operate my valves by the wire line impressing approximately 15 or 16 pounds on the knob 14, which unseats the pilot valve which controls the operations of the main valve. Furthermore, it is obvious that when the valve member 22 moves away from its seat it fully moves away from the same without preventing an obstructed and restricted passageway as would be the case where ball valves are employed.

In Fig. 2 the construction of the valve mechanism near the bottom thereof, and generally designated "A" is identical with the pilot valve construction described in connection with Fig. 1, except that the passageway 7' extends upwardly instead of downwardly. This pilot valve mechanism is mounted in a housing 30 provided with a vertically extending passageway 31 which passageway 31 communicates with a pipe 32 screw-threaded into the housing 30. The pipe 32 is received at its upper end by a connection 33 threaded into a housing 34. The housing 34 is formed integral with or connected to a connection 35 which at its upper end receives a lower section of tubing 2. The lower end of the connection 35 receives a connection 36 which in turn is screw-threaded to a connection 37 integral with or screwed to the housing 30. The lower end of the connection 37 receives the upper end of the tubing 2. All of these connections have a passageway for oil of substantially the same size as the conduit extending through the tubing so that the oil can flow freely up through said tubing and connection.

In the housing 31 is a chamber 38 which receives an operating valve member 22' identical in construction with the member 22 shown in Fig. 1 except that it is turned upside down. A spring 39 is interposed between the lower end of the valve member 22' and the upper end of the connection 33, tending to push the valve member 22 upwardly so as to seat the valve 25' against the valve seat 26' formed in a flange 40 having an aperture therethrough communicating with a passageway 41 leading from the chamber 38 into the interior of the tubing string. The housing 34 is provided with a port 27' leading from the compressed air space in the casing into that part of the chamber 38 above the flange 24'.

The operation of the structure shown in Fig. 2 is very similar to the operation of the structure shown in Fig. 1. With the parts in the position shown in Fig. 2 the main operating valve is closed and the pilot valve is closed, the air passing through the aperture 13', passing upwardly through the passageway 7', passageway 31, pipe 32, connection 33 into the dead air space beneath the main operating valve 22' so that the lower end of the main operating valve 22' receives not only the casing pressure, but the pressure of the spring 39, while the upper part of the valve which projects through the valve seat 26' receives the tubing pressure and the remainder thereof including the flange 24' receives casing pressure through the port 27'. The valve 25' is, therefore, securely held against its valve seat 26' and the pilot valve is held against its seat precisely as in the condition described in Fig. 1.

If desired, I may employ a weight 15' which is a cylinder, having open ends, secured to the wire line 16 by any conventional means. Such a construction allows the oil to pass not only around the weight but through it. In any case, when the weight is raised, the pilot valve is opened as heretofore described closing the aperture 13' and the compressed gas beneath the main operating valve will by-pass through the pilot valve into the tubing thereby relieving the compressed air pressure below the main valve and the casing pressure being exerted on the flange 24' and that part of the valve 25' not projecting through the valve seat is sufficient to compress the spring 39 and move the valve 25' away from its valve seat so that the compressed gas in the casing may now flow through the port 27' and passageway 41 into the tubing. When the weight is lowered the pilot valve closes, opening the aperture 13' so that casing pressures are again impressed against the lower end of the main valve 25 thereby causing the valve 25' to move against the valve seat 26' and stopping the flow of compressed gas into the tubing.

In stating that the weight is raised to unseat the pilot valve and is lowered so as to release it so that the spring can again seat the pilot valve, I do not mean to exclude the reverse of this operation for, obviously, if the weight is normally held above the knob 14 of the pilot valve, the pilot valve will be opened if the weight is lowered, provided the weight is sufficiently heavy to operate the pilot valve. Ordinarily I prefer to have the weight, when in its inoperative position, below the pilot valve and to raise the weight to open the pilot valve. But, it is purely a matter of preference as to whether or not the weight is normally below or above the pilot valve. When the structure is used as shown in Fig. 2, it would be preferable to place the weight below the pilot valve for the weight would then in no wise interfere with the oil elevated by the compressed gases.

Fig. 3 is identical with the construction of the pilot valve heretofore described except that the valve stem 12' is omitted at the right of the pilot valve and therefore does not project into the aperture 13''. When this construction is employed and the pilot valve is open, compressed gas would continue to pass through the aperture 13'' and around the pilot valve into the tubing, but since the size of the aperture 13'' is very much smaller than the opening through which the pilot valve stem projects, the pressure in the chamber 8' will be materially lower than the pressure in the casing and with the result that the mechanism would operate otherwise in precisely the same way as heretofore described in either Figs. 1 or 2.

In brief, I believe that I am the first to suggest a wire line operated pilot valve which controls a second main operating valve which second valve directly controls the introduction of pressure fluid into a column of oil for lifting purposes.

I realize that many changes may be made in the specific form of the invention shown by way of illustration herein and I, therefore, desire to claim the same broadly except as I may limit myself in the appended claims.

Having now described my invention, I claim:

1. In combination with a well casing and flow line having a compressed gas chamber therebetween, a main valve to admit compressed gas from the chamber into the flow line, a pilot valve partly projecting into the flow line and controlling the operation of the main valve, a reciprocatable wire line in the flow line and means on the wire line to control the pilot valve.

2. In combination with a flow line and a compressed gas chamber, a main valve to admit compressed gas from the chamber into the flow line, a pilot valve carried by said flow line and partly projecting into the flow line and serving as a means to control the main valve, a reciprocatable wire line in the flow line, and means on the wire line to control the pilot valve.

3. In combination with a flow line and a compressed gas chamber, a pilot valve partly projecting into the flow line, a main valve to admit compressed gas from the chamber into the flow line and controlled by the pilot valve, said valves being carried by the flow line, said main valve controlling a passageway leading from the outside to the inside of said flow line, and a reciprocatable wire line means in the flow line to control the pilot valve.

4. In combination with a flow line and a compressed gas chamber, a pilot valve carried by said flow line and having a part thereof projecting into the flow line, a main valve to admit compressed gas from the chamber into the flow line and controlled by the pilot valve, and means in the flow line adapted to be raised or lowered to engage or disengage the part of the pilot valve projecting into the flow line to control the pilot valve.

5. In combination with a flow line, and a casing, a main valve to control a passageway leading from the interior of the casing to the interior of the flow line, a pilot valve to control said main valve and a wire line operated weight in the flow line to control the pilot valve.

6. In combination with a flow line positioned in a well, a main valve for controlling the admission of gas into the flow line, a part of said main valve when closed being exposed to the pressure outside the flow line and a part thereof being exposed to the pressure inside the flow line, a second valve to control differential pressures acting on the main valve and a reciprocatable wire line operated weight controlled from the surface of the ground to control said second valve.

7. In combination with a flow line positioned in a well, a main valve for controlling the admission of gas into the flow line, a part of said main valve when closed being exposed to the pressure outside the flow line and a part thereof being exposed to the pressure inside the flow line, a second valve to control differential pressures acting on the main valve and a reciprocatable wire line operated weight to control said second valve.

8. In combination with a flow line in a well, a main valve to control the admission of pressure gas into the flow line, a second valve projecting into the flow line to control the pressure acting on the main valve to govern the operation thereof and a reciprocatable wire line operated weight in the flow line to control the second valve.

9. In a gas lift system including a flow line in a well, a main valve to control a passageway leading into the flow line, a part of said main valve when closed being exposed to the pressure outside the flow line and a part thereof being exposed to the pressure inside the flow line, a pilot valve projecting into the flow line and controlling in part the pressure acting on said main valve and a reciprocatable wire line operated weight to control the pilot valve.

10. In a gas lift system including a flow line in a well, a main valve to control a passageway leading into the flow line, a second valve controlling the main valve and partly projecting into the flow line, and means in the flow line to engage or disengage the projecting part of the second valve to control the operation thereof.

11. In a gas lift system including a flow line in a well, a main valve to open or close a passageway leading into the flow line and thereby to control the admission of compressed gas into the flow line, one end of the main valve being subjected to the gas pressure outside of the flow line when the main valve is closed, and wire line controlled means to relieve the pressure acting on said end of the main valve so that said main valve may be opened.

12. In a gas lift system including a flow line in a well, a main valve to open or close the passageway to control the admission of compressed gas into the flow line, said main valve being subjected at one end to the gas pressure outside of the flow line when said main valve is closed thereby tending to maintain the said valve in closed position, means to relieve the pressure acting on said end of the main valve, said means including a second valve and wire line controlled means to control said second valve.

13. In a gas lift system in connection with a flow line and a well casing with a compressed air chamber therebetween, including a valve stem, a valve seat carried by the flow line, a valve and a knob on the valve stem, a spring tending to urge said valve to closed position on the valve seat, said knob projecting into the flow line, a wire line means adapted to be actuated to contact said knob and unseat the valve from its valve seat, and a main valve controlled by the first named valve to control a passageway leading from the compressed air chamber into the flow line.

14. In a gas lift system including a flow line in a well casing having a compressed air chamber between the flow line and the casing, a main valve to open or close a passageway leading from said chamber into the flow line, a normally trapped gas chamber having a passageway extending to the compressed air chamber, one end of the main valve being exposed to the gas in the trapped gas chamber, a second valve and a reciprocatable wire line operated weight to open said second valve to release the gas in the normally trapped gas chamber to thereby permit the gas previously trapped therein to escape into the flow line.

15. In a gas lift system including a flow line in a well casing having a compressed air chamber between the flow line and the casing, a main valve to open or close a passageway leading from said chamber into the flow line, a normally trapped gas chamber having a passageway extending to the compressed air chamber, one end of the main valve being exposed to the gas in the trapped gas chamber, a second valve, and a reciprocatable wire line operated weight to open said second valve to release the gas in the normally trapped gas chamber to thereby permit the gas previously trapped therein to escape into the flow line and to close the passageway leading from the compressed air chamber into the trapped gas chamber.

16. As a subcombination of a gas lift system having a flow line in a well casing with a compressed air chamber between the flow line and casing, a second chamber having a passageway leading to the compressed air chamber and normally containing gas at the same pressure as the pressure in the compressed air chamber, a normally closed wire line operated valve to control a passageway leading from the second chamber into the flow line so that when said valve is opened, the gas in the second chamber will escape into the flow line, and a second valve controlled by the first valve to control the admission of compressed gas from the second chamber into the flow line.

17. As a subcombination of a gas lift system having a flow line in a well casing with a compressed air chamber between the flow line and the casing, a second chamber having a passageway leading to the compressed air chamber and normally containing gas at the same pressure as the pressure in the compressed air chamber, a wire operated valve to control a passageway leading from the second chamber into the flow line so that when said valve is opened, the gas in the second chamber may escape into the flow line and means to close the passageway leading from the compressed air chamber to the second chamber when the said valve is opened.

18. As a subcombination of a gas lift system having a flow line in a well, a housing carried by the flow line and provided with a bore extending through the same, a plug in said bore and provided with an opening forming a valve seat, a valve stem passing through said opening, a valve on said valve stem on one side of said plug adapted to seat on said valve seat and a knob on the valve stem on the other side of said plug, a spring interposed between the plug and the knob and tending to urge the valve towards its valve seat, said knob projecting into the flow line, means in the flow line to engage the knob and open said valve and a closure plug to hold the first named plug in position, said closure plug being provided with a hole to allow gases to pass into a chamber between the said plugs.

19. As a subcombination of a gas lift system having a flow line in a well, a housing carried by the flow line and provided with a bore extending through the same, a plug in said bore and provided with an opening, a valve on said valve stem on one side of said plug adapted to seat on said valve seat and a knob on the valve stem on the other side of said plug, a spring interposed between the plug and the knob and tending to urge the valve towards its valve seat, said knob projecting into the flow line, means in the tubing string to engage the knob and open said valve, and a closure plug adapted to be screwed into said bore to hold the first-named plug in position.

20. As a subcombination of a gas lift system having a flow line in a well, a housing carried by the flow line and provided with a bore extending through the same, a plug in said bore and provided with an opening, a valve on said valve stem on one side of said plug adapted to seat on said valve seat and a knob on the valve stem on the other side of said plug, a spring interposed between the plug and the knob and tending to urge the valve towards its valve seat, said knob projecting into the flow line, means in the flow line to engage the knob and open said valve, and a closure plug adapted to be screwed into said bore to hold the first-named plug in position, said closure plug being provided with means so that a tool may engage the said means and screw said closure plug firmly against said first-named plug.

RAYMOND G. TAYLOR, Jr.